UNITED STATES PATENT OFFICE 2,457,271

MODIFICATION OF PREFORMED MONO-OLEFIN/CARBON MONOXIDE POLYMERS

Paul S. Pinkney, Wilmington, Del., assignor to E. I. du Pont de Nemours & Company, Wilmington, Del., a corporation of Delaware No Drawing. Application January 31, 1945, Serial No. 575,560

20 Claims. (Cl. 260—66)

This invention relates to methods for modifying preformed monoolefin/carbon monoxide polymers.

This invention has for an object the provision of a simple and practical method for modifying the properties of monoolefin/carbon monoxide polymers. Another object is to provide a simple and practical method for increasing the unsaturation of monoolefin hydrocarbon/carbon monoxide polymers. Still another object is to provide a method for increasing the degree of unsaturation of ethylene/carbon monoxide polymers without substantially decreasing their solubility in organic solvents. Another object is to provide modified ethylene/carbon monoxide polymers.

The above and other objects appearing hereinafter are attained by contacting a monoolefin/carbon monoxide polymer with a minor proportion of a basic compound, of the type hereinafter defined, in the presence of an organic solvent, until either the amount of combined oxygen in the polymer has been reduced by at least 5% or the iodine number of the polymer has been increased to at least 25.

In one adaptation of the invention, an ethylene/carbon monoxide polymer is heated in solution in an organic solvent with a minor amount of an alkali metal hydroxide until the combined oxygen content of the polymer has been decreased by at least 5% or the iodine number of the polymer has been increased to at least 25. As the invention is generally practiced, the ethylene/carbon monoxide polymer is dissolved in hot dioxane or dioxolane containing a small amount of water or methanol and to this solution is added from 1 to 10% (based on the weight of the polymer in the solution) of an alkali metal hydroxide as a 0.7 normal solution in methanol. The resulting reaction mixture darkens, and the heating is continued at least until a sample of the reaction mixture forms a clear solution when diluted with about four to five times its volume of water. Thereafter the reaction mixture is dissolved in water and acidified with a mineral acid, e. g., hydrochloric acid. The product which separates is isolated by conventional methods, washed with water, and dried.

The examples which follow are submitted to illustrate and not to limit this invention. Unless otherwise stated, parts are by weight.

*Example 1.*—A film 0.015 inch thick from the propylene/ethylene/carbon monoxide polymer prepared as described below, is pressed at 130° C. between smooth surfaces. The film is immersed in a 0.7 normal solution of potassium hydroxide in methanol. The solution is boiled for 3 minutes and the film is washed with water and dried. The treated film is insoluble in chloroform and dioxane and is much more pliable than before treatment.

The propylene/ethylene/carbon monoxide polymer used in the above experiment is prepared as follows:

A silver-lined pressure reactor is flushed with nitrogen, charged with 100 parts of benzene and 0.5 part of diethyl dioxide, closed, evacuated, charged further with 25 parts of propylene, and pressured to 300 atms. with a mixture of carbon monoxide and ethylene containing 30% carbon monoxide. The reaction mixture is heated to 130° C. and kept at 129°–132° C. for 17 hours while the pressure is held at 850–1000 atms. by occasional repressuring with the ethylene/carbon monoxide mixture. The product is milled on a hot rubber mill to remove the benzene. The yield of polymer is 57 parts. Analysis shows it to contain 40% carbon monoxide by weight.

*Example 2.*—To a boiling solution of 30 parts of an ethylene/carbon monoxide polymer, prepared as described hereinafter, in 300 parts of 1,3-dioxolane containing 0.3% water is added a solution of 8 parts of potassium hydroxide in 160 parts of methanol. Boiling is continued for 25 minutes. The clear, dark reaction mixture is poured into 2500 parts of water. Acetic acid is added to the resulting clear solution until no further precipitation occurs. The yellow precipitate is collected on a filter, washed with water, and dried at room temperature. The yield of product isolated in this manner is 23 parts. It is readily soluble in chloroform or dioxane. It has an intrinsic viscosity of 0.1 determined at 25° C. in chloroform at a concentration of 0.1 g./100 ml. of solution. It has an iodine number of 122 and contains 72.63% carbon and 8.11% hydrogen, while the original ethylene/carbon monoxide polymer has an iodine number of 5 and contains 67.65% carbon and 8.35% hydrogen. Thus the loss of combined oxygen from the polymer as a result of the treatment amounts to 25%.

The alkali treated polymer is useful as an ingredient of thermosetting molding compositions as illustrated by the following example.

A molding composition is prepared by milling together in a ball mill 21 parts of alkali-treated ethylene/carbon monoxide polymer, 27 parts of wood flour, 5.5 parts of paraformaldehyde, and 0.5 part of maleic acid. Bars molded from this composition at 2000 lb./sq. in. and a temperature of 160° C. for 5 minutes are hard, rigid, strong, tough, and resistant to deformation at temperatures up to 145° C.

The alkali-treated polymer applied with paraformaldehyde and an acid catalyst from solutions in ethylene dichloride or from an aqueous dispersion is useful also as a thermosetting bonding agent for plywood and for laminated paper and fabrics.

The ethylene/carbon monoxide polymer used in the above experiment is made as follows:

A silver-lined pressure reactor is flushed with nitrogen, charged with 100 parts of dioxane and 0.5 part of diethyl dioxide, closed, evacuated, and pressured to 250 atm. with a mixture of carbon monoxide and ethylene containing 30% carbon monoxide. The reaction mixture is heated to 130° C. and kept at 128–132° C. for 10 hours while the pressure is held at 600 to 700 atm. by occasional repressuring with the ethylene/carbon monoxide mixture. The product is worked on a hot rubber mill to remove the dioxane. The yield of polymer is 95 parts. Analysis shows it to contain 42% carbon monoxide by weight. It has an intrinsic viscosity of 0.4 determined at 25° C. in chloroform at a concentration of 0.1 g./100 ml. of solution.

*Example 3.*—To a boiling solution of 50 parts of an ethylene/carbon monoxide/diethyl maleate polymer, prepared as described hereinafter, in 500 parts of dioxane containing 25 parts of water is added a solution of 10.3 parts of potassium hydroxide in 200 parts of methanol. Boiling is continued for 8 minutes. The clear, dark reaction mixture is poured into 6000 parts of water. The resulting clear solution is strongly acidified with hydrochloric acid. The precipitated product is collected on a filter, washed with water, and dried at room temperature. The yield of product is 43 parts. It is readily soluble in chloroform, dioxane, or an aqueous sodium hydroxide solution. When employed as a plywood adhesive, 9 parts of this product used with 1 to 2 parts of paraformaldehyde forms strong bonds which are only slightly weakened by a boiling water treatment.

This experiment is repeated, except that finely divided barium hydroxide in suspension is employed in place of potassium hydroxide. A similarly modified resin is thus obtained.

The ethylene/carbon monoxide/diethyl maleate polymer used in the above example is prepared as follows: A silver-lined pressure reactor is flushed with nitrogen and charged with 100 parts of dioxane, 10 parts of diethyl maleate, and 0.5 part of diethyl dioxide. The reactor is then closed, evacuated, and pressured to 250 atm. with a mixture of carbon monoxide and ethylene containing 30% carbon monoxide. The reaction mixture is heated to 130° C. and kept at 127° to 131° C. for 8 hours while the pressure is held at 600–700 atm. by occasional repressuring with the ethylene/carbon monoxide mixture. The solvent and unreacted diethyl maleate are removed from the resulting polymer by distillation with steam and the polymer is dried by working on a warm rubber mill. The yield of polymer is 75 parts. It contains 10% diethyl maleate, and 41% carbon monoxide by weight. Its intrinsic viscosity is 0.42 determined at 25° C. in chloroform at a concentration of 0.1 g./100 ml. of solution.

*Example 4.*—To a hot solution of 30 parts of an ethylene/carbon monoxide polymer, prepared as described in Example 2, in a mixture of 150 parts of dioxane and 16 parts of methanol is added a solution of 1 part of potassium hydroxide in 20 parts of methanol. The reaction mixture is boiled gently for 1 hour and 20 minutes and then poured into 500 parts of water. Dilute hydrochloric acid is added in excess to the resulting clear, dark solution until no further precipitation occurs. The precipitate is collected on a filter, washed with water, and dried at room temperature. The yield of alkali-treated polymer is 26 parts. It is soluble in chloroform and contains 74.3% carbon and 7.58% hydrogen. The loss of combined oxygen from the polymer as a result of the treatment amounts to 35%.

The alkali-treated polymer is useful as an ingredient of thermosetting molding compositions. When compounded with wood flour, paraformaldehyde, and maleic acid and molded as described in Example 2, it forms objects which are hard, rigid, strong, and tough.

Although the specific examples given above pertain to polymers of carbon monoxide with ethylene alone and to polymers of carbon monoxide with ethylene and either propylene or diethyl maleate, it is to be understood that in the practice of the invention any polymer of carbon monoxide with a monoolefin alone or in conjunction with another polymerizable organic compound can be used. For example, there can be used any of the polymers of carbon monoxide and a monoolefin (e. g., ethylene, propylene, the butylenes) disclosed and claimed in the copending applications of M. M. Brubaker, S. N. 449,765, filed July 4, 1942, now abandoned, and S. N. 552,374, filed September 1, 1944. For the preparation of modified polymers for use in thermosetting compositions it is preferred to employ soluble polymers containing from 40 to 50 weight per cent of carbon monoxide.

When the modified polymer is to be blended with formaldehyde to yield thermosetting compositions, the molecular weight of the original polymer is not critical. However, for best results it is generally desirable to use soluble polymers having intrinsic viscosities 0.25 or above, as determined at 25° C. in chloroform at a concentration of 0.1 gram/100 ml. of solution.

In the practice of this invention there can be used any basic alkali or alkaline earth metal compound. By "basic" as used herein is meant that the material in its free state can react with acids to form salts. Examples of suitable basic materials are sodium, potassium, and lithium hydroxides, sodium, potassium, and lithium carbonates, sodium and potassium acetates, disodium and trisodium phosphates, sodium, potassium, and lithium alcoholates, etc. In general, substances which yield the aforesaid hydroxides on hydrolysis will be understood to be equivalent to the hydroxides. From the standpoint of economy and effectiveness, the alkali metal hydroxides, especially sodium and potassium hydroxides, are preferred.

The amount of basic compound added should be in excess of 1% and need not exceed about 10% by weight of the polymeric composition, except when the polymer contains a saponifiable component. The preferred range of basic compound is about 2 to 8%. The basic compound may be added to the polymer either by mixing solutions of the basic compound and polymer in suitable solvents, by adding the basic material to a suspension of the polymer in an organic solvent, or by simply dipping the polymer in a solution of the basic compound in a suitable solvent.

Although Examples 2 and 4 have illustrated treatment of the polymer in the presence of dioxolane and dioxane, it is contemplated that other organic media which are unreactive with the polymer or base under the conditions employed can be used.

As a rule, the treatment with basic materials according to this invention is carried out in solutions containing not more than 25% by weight of polymer. At concentrations in excess of this value undesirable side reactions begin to predominate and this leads to the obtainment of products which are less desirable for use as intermediates for thermosetting resins.

The extent of the amount of combined oxygen loss during the reaction increases with increased duration of the treatment, with increased concentration of polymer and of alkali in the reaction mixture, and with increased temperature. It decreases, however, with an increase in the proportion of water or methanol added to the polymer solution before the alkali addition. By properly controlling these variables the extent of modification of the polymer can be controlled.

In the case of ethylene/carbon monoxide polymers, combined oxygen loss provides a ready means for estimating the extent of unsaturation resulting from the alkali treatment. In the case of polymers synthesized from other components in addition to carbon monoxide and ethylene, which components contain oxygen, the iodine number of the treated polymer is taken as a measure of the degree of unsaturation brought about by the alkali treatment. In such instances, the iodine number of the polymer should be at least 25. By "iodine number" is meant the number of centigrams of iodine absorbed per gram of sample. When oxygen loss is to be used as the measure of the extent of modification, the treatment should be conducted until at least a 5% loss in the combined oxygen content of the polymer has been effected.

The products most useful in thermosetting compositions are those in which the degree of unsaturation is that corresponding to either a combined oxygen loss of at least 15% or an iodine number of at least 90.

In general the amount of water or methanol contained in the polymer solution before addition of the basic compound will vary from 1 to 20% by weight, based on the polymer solvent.

The process may be operated at temperatures ranging from 20° C. up to the decomposition temperature of the polymer being treated (cf. copending application Serial Number 575,559, filed Jan. 31, 1945). It is generally preferred, however, to operate at temperatures ranging from about 50° C. to 175° C.

The products of this invention are useful as molded articles, unsupported films, and the like.

The process of this invention provides a simple and practical way for modifying the properties of polymers of carbon monoxide with monoolefins alone and in conjunction with other polymerizable organic compounds.

The process is generally carried out at atmospheric pressure but, if desired, pressures in excess of atmospheric can be used.

Although the use of acetic and hydrochloric acids in the acidification step is illustrated in the examples, it is to be understood that other acids can be employed. Strong mineral acids, such as hydrochloric, sulfuric, and phosphoric, are preferred because with these precipitation of the product is more complete.

To the compositions of the invention there may be added reinforcing agents, fillers, pigments, dyes, plasticizers, and the like. The modified polymers of this invention can also be blended with formaldehyde to obtain thermosetting compositions, as described in my copending application S. N. 599,318, filed June 13, 1945, now Patent No. 2,441,082.

I claim:

1. In a process for modifying monoolefin hydrocarbon/carbon monoxide polymers, said monoolefin being an acyclic hydrocarbon containing from 2 to 4 carbon atoms per molecule, the steps which comprise reacting the said polymer with from 1% to 10% by weight, based on the weight of the polymer, of a basic material of the class consisting of basic alkali metal and basic alkaline earth metal compounds, in an organic medium which is a solvent for the base and the polymer, at a temperature within the range of from 20° C. to the decomposition temperature of the said polymer, said polymer and basic material being the sole reactants, continuing the resulting reaction until a substantial, but incomplete, deoxygenation of the polymer has occurred, diluting the resulting mixture with water, and thereafter precipitating the resulting alkali treated polymer by acidifying the resulting mixture.

2. In a process for modifying monoolefin/carbon monoxide polymers, said monoolefin being an acyclic hydrocarbon containing from 2 to 3 carbon atoms per molecule, the steps which comprise reacting the said polymer with from 1% to 10% by weight, based on the weight of the polymer, of a basic material of the class consisting of basic alkali metal and basic alkaline earth metal compounds in an organic medium which is a solvent for the base and the polymer, at a temperature of from 50° to 175° C., whereby the oxygen content of the said polymer is decreased by from 5% to 35%, said polymer and basic material being the sole reactants, diluting the resulting mixture with water, and thereafter precipitating the resulting alkali treated polymer by acidifying the resulting mixture.

3. The process set forth in claim 2 in which the said organic solvent is methanol.

4. The process set forth in claim 2 in which the said organic solvent is dioxane.

5. The process set forth in claim 2 in which the said organic solvent is 1,3-dioxolane.

6. The process set forth in claim 2 in which the said monoolefin/carbon monoxide polymer is an ethylene/carbon monoxide polymer.

7. The process set forth in claim 2 in which the said monoolefin/carbon monoxide polymer is an ethylene/propylene/carbon monoxide polymer.

8. The process set forth in claim 2 in which the said monoolefin/carbon monoxide polymer is an ethylene/carbon monoxide/diethyl maleate polymer.

9. An alkali-modified interpolymer of carbon monoxide with an acyclic hydrocarbon having from two to three carbon atoms per molecule, characterized in that it contains from 5% to 35% less combined oxygen than the parent interpolymer, has a substantially higher iodine number than the said parent interpolymer, is soluble in methanol-dioxane mixture, and is precipitated from solution in methanol-dioxane mixture by the action of dilute hydrochloric acid.

10. In a process for modifying monoolefin-carbon monoxide polymers, said monoolefin having from two to three carbon atoms per molecule, the steps which comprise reacting the said polymer with from 1% to 10% by weight, based on the weight of the polymer, of a basic material of the class consisting of basic alkali metal and basic alkaline earth metal compounds in an organic medium which is a solvent for the base and the polymer, at a temperature of from 50° to 175° C., whereby the oxygen content of the said polymer is decreased by at least 5%, said polymer and basic material being the sole reactants, diluting the resulting mixture with water, and thereafter precipitating the resulting alkali treated polymer by acidifying the resulting mixture.

11. In a process for modifying ethylene/carbon monoxide polymers the steps which comprise reacting the said polymer with 1% to 10% by weight of a basic material of the class consisting of basic alkali metal and basic alkaline earth metal compounds, at a temperature within the range of 50° to 175° C., in an organic medium which is a solvent for the base and the polymer, whereby the oxygen content of the said polymer is decreased by from 25% to 35%, said polymer and basic material being the sole reactants, and thereafter acidifying the resultant alkali treated polymer.

12. In a process for modifying ethylene/carbon monoxide polymers the steps which comprise heating the said polymer with 1% to 10% by weight of a basic material of the class consisting of basic alkali metal and basic alkaline earth metal compounds at a temperature in the range of 50° to 175° C., in a mixture of water and an organic solvent as a reaction medium, which medium is a solvent for the base and the polymer, whereby the oxygen content of the said polymer is decreased by at least 5%, said polymer and basic material being the sole reactants, and thereafter precipitating the resulting alkali treated polymer by acidifying the resultant mixture.

13. In a process for modifying ethylene/carbon monoxide polymers the steps which comprise heating an ethylene/carbon monoxide polymer with 1% to 10% by weight of a basic material of the class consisting of basic alkali metal and basic alkaline earth metal compounds at a temperature in the range of 50° to 175° C., in the presence of a mixture of water and an organic solvent which mixture is a solvent for both the polymer and the base, whereby the oxygen content of the said polymer is decreased by at least 5%, said polymer and basic material being the sole reactants, and thereafter precipitating the resulting alkali treated polymer with acetic acid.

14. In a process for modifying ethylene/carbon monoxide polymers the steps which comprise reacting an ethylene/carbon monoxide polymer with 1% to 10% by weight of a basic material of the class consisting of basic alkali metal and basic alkaline earth metal compounds at a temperature in the range of 50° to 175° C., in the presence of a mixture of water and an organic liquid medium which mixture is a solvent for the base and the polymer, whereby the oxygen content of the said polymer is decreased by at least 5%, said polymer and basic material being the sole reactants, and thereafter precipitating the resulting alkali treated polymer with aqueous hydrochloric acid.

15. In a process for modifying monoolefin/carbon monoxide polymers, said monoolefin being an acyclic hydrocarbon having from 2 to 3 carbon atoms per molecule, the steps which comprise reacting the said polymer with from 1% to 10% by weight of a basic material of the class consisting of basic alkali metal and basic alkaline earth metal compounds at a temperature in the range of 50° to 175° C. in an organic liquid medium which is a solvent for the base and the polymer, said polymer and base being the sole reactants, continuing the resulting reaction until partial deoxygenation of the polymer has occurred and a substantial amount of the oxygen remains in the polymer, the oxygen content of the resulting polymer being thereby decreased more than 5%, diluting the resulting mixture with water, and thereafter precipitating the resulting solution of alkali treated polymer by acidifying the resulting mixture.

16. The process set forth in claim 15 in which the said monoolefin/carbon monoxide polymer is an ethylene/carbon monoxide polymer.

17. The process set forth in claim 15 in which the said monoolefin/carbon monoxide polymer is an ethylene/propylene/carbon monoxide polymer.

18. The process set forth in claim 15 in which the said monoolefin/carbon monoxide polymer is an ethylene/carbon monoxide/diethyl maleate polymer.

19. An alkali-treated interpolymer of carbon monoxide with ethylene, said polymer prior to alkali-treatment having 40 to 50% by weight of carbon monoxide, said alkali-treated interpolymer being characterized in that it contains from 25 to 35% less combined oxygen than the parent interpolymer, is soluble in methanol-dioxane mixture, and is precipitated from solution in methanol-dioxane mixture by the action of dilute hydrochloric acid.

20. In a process for modifying monoolefin/carbon monoxide polymers, said monoolefin having from two to three carbon atoms per molecule, the steps which comprise reacting the said polymer with from 1% to 10% by weight, based on the weight of the polymer, of a basic material of the class consisting of basic alkali metal and basic alkaline earth metal compounds in an organic medium which is a solvent for the base and the polymer, at a temperature of 50° to 175° C., and continuing the resulting reaction until the oxygen content of the said polymer is decreased by at least 5%, the alkali-treated polymer thus formed being one which precipitates from the resulting solution by the action of dilute hydrochloric acid.

PAUL S. PINKNEY.

REFERENCES CITED

The following references are of record in the file of this patent:

UNITED STATES PATENTS

| Number | Name | Date |
| --- | --- | --- |
| 2,351,120 | Hanford | June 13, 1944 |